Aug. 19, 1941.  E. HASSIG  2,253,028
ROTARY CUTTING TOOL
Filed April 23, 1938  4 Sheets-Sheet 1

INVENTOR
Edward Hassig
BY
Wheeler, Wheeler & Wheeler
ATTORNEY

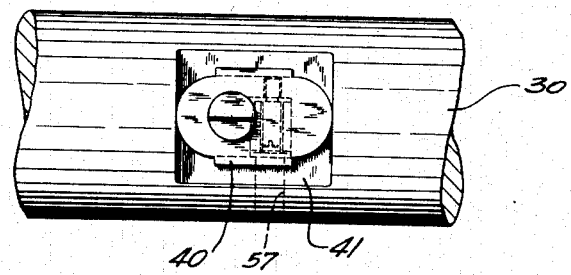
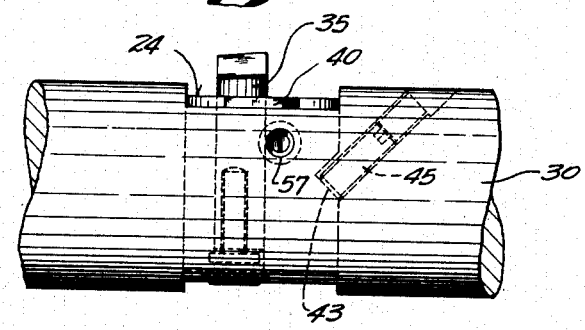
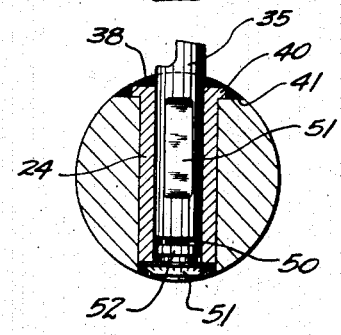
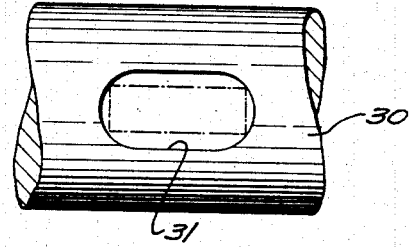

Aug. 19, 1941.  E. HASSIG  2,253,028
ROTARY CUTTING TOOL
Filed April 23, 1938  4 Sheets-Sheet 3

INVENTOR
Edward Hassig
BY
Wheeler, Wheeler & Wheeler
ATTORNEY

Aug. 19, 1941.                    E. HASSIG                    2,253,028
                              ROTARY CUTTING TOOL
                    Filed April 23, 1938              4 Sheets-Sheet 4
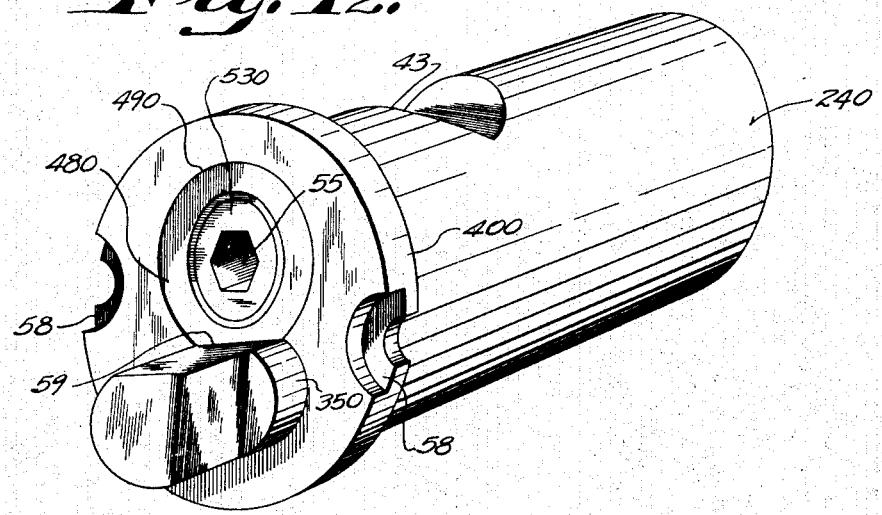
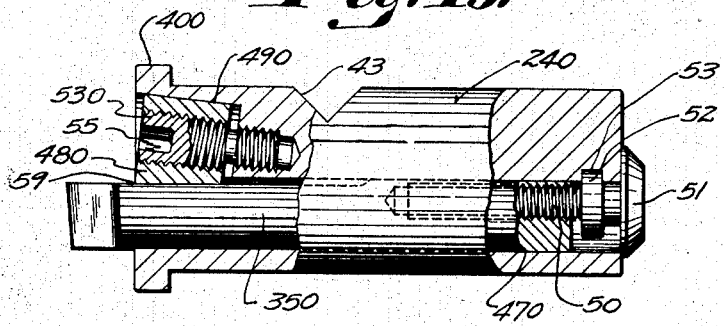
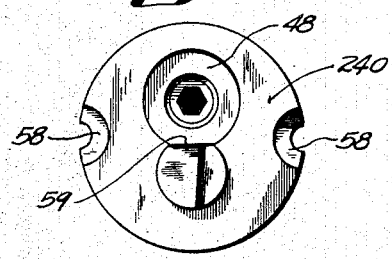 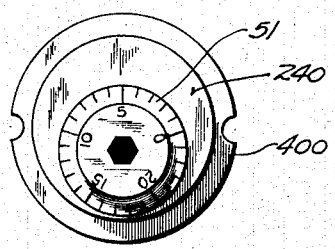
INVENTOR
Edward Hassig
BY
Wheeler, Wheeler and Wheeler
ATTORNEY Patented Aug. 19, 1941

2,253,028

UNITED STATES PATENT OFFICE 2,253,028

ROTARY CUTTING TOOL

Edward Hassig, Milwaukee, Wis., assignor to Wetmore Reamer Company, Milwaukee, Wis., a corporation of Wisconsin Application April 23, 1938, Serial No. 203,773

12 Claims. (Cl. 77—58)

This invention relates to improvements in rotary cutting tools.

It is the primary object of the invention to provide novel and improved means for replaceably and adjustably mounting a cutter in a tool carrier.

The invention has reference both to new tools, and to the repair of old tools. In repair work it has great significance, as it enables a worn out cutter, perhaps having no adjustment capable of accurately positioning it with respect to the tool body, to be entirely replaced with a new mounting which is rigidly seated in the carrier, and with respect to which a new tool is accurately adjusted and positioned.

For example, a boring bar in an expensive machine tool may include a tool element which has so worn the slot in which it is disposed as to indicate the necessity of replacing not merely the tool element but the entire boring bar. By means of the present invention a new mounting may be placed in the boring bar and a new tool provided with micrometer adjustment and with rigid anchorage in the new mounting, thus saving the necessity for replacing the bar.

Another object of the invention is to provide a tool mounting of such form as to facilitate the machining of the bar or other carrier to receive the mounting.

Still other objects include the provision of means for absorbing all thrusts to which the mounting is subject, thus permitting no movement of the mounting respecting the bar, and consequently avoiding any wear between these parts.

Other objects will appear from the following disclosure.

In the drawings:

Figure 2 is a view in side elevation showing my invention embodied in a somewhat different tool construction.

Figure 3 is a view in side elevation of the same structure shown in Figure 2, the structure having been rotated 90° from its Figure 2 position.

Figure 4 is a detail view taken in transverse section through the tool structure shown in Figures 2 and 3.

Figure 5 is a detail view of the boring bar or carrier, showing the opening therein to receive a substitute mounting made in accordance with the present invention.

Figure 12 is a view in perspective of a modified embodiment of the tool mounting and assembly.

Figure 13 is a view on a reduced scale, partially in side elevation and partially in longitudinal section, through the assembly shown in Figure 12.

Figure 1:
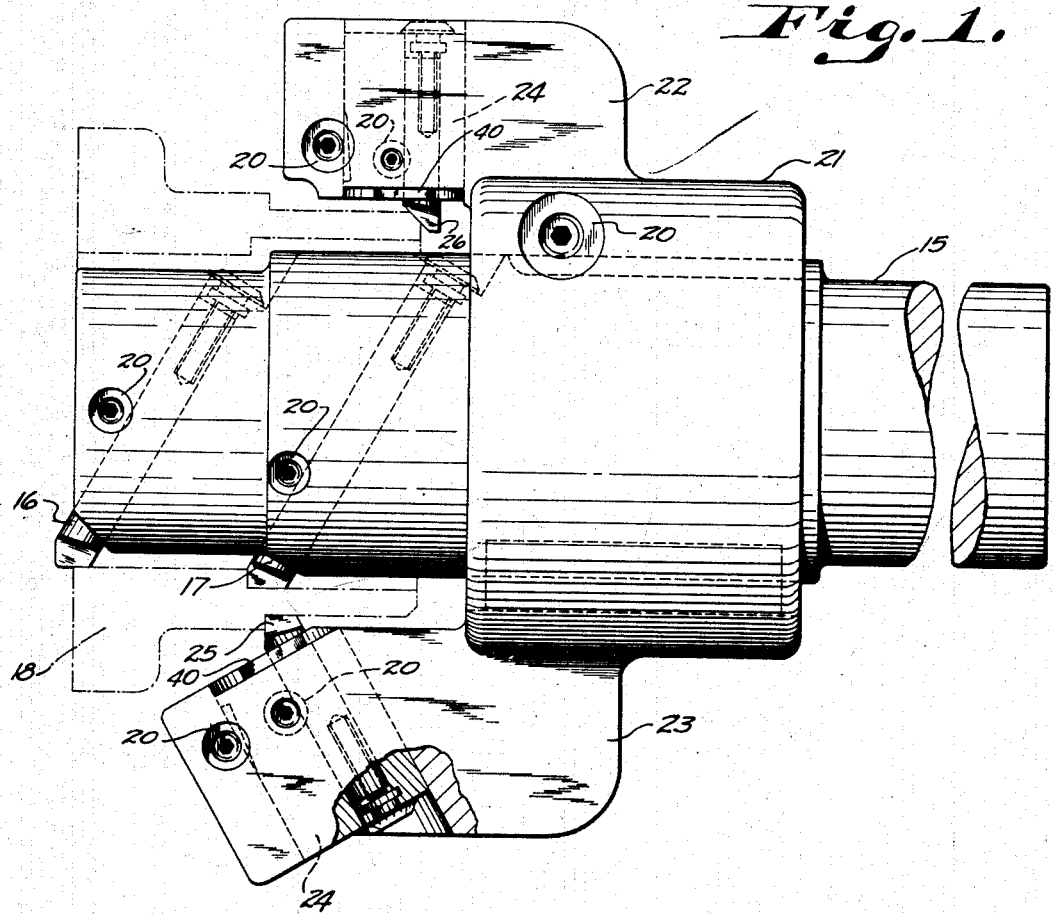
Figure 1 is a view in side elevation of a tool organization embodying my invention.
Figure 9:
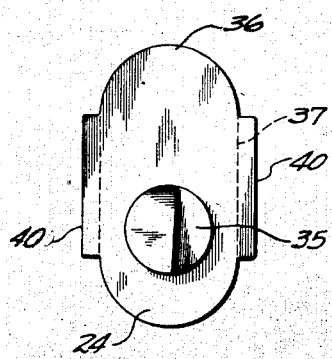
Figure 9 is an end elevation of the tool mounting and assembly.

Figures 14 and 15, respectively, represent opposite end elevations of the device shown in Figures 12 and 13.

Like parts are identified by the same reference characters throughout the several views.

Figure 1 illustrates, by way of example, some of the various types of work for which my invention is adapted. In this case a spindle 15 is provided in the manner disclosed in my Patent No. 2,096,489, with a boring tool 16 and a counter-boring tool 17 operating concurrently upon the work indicated in broken lines at 18.

Secured on the spindle 15, by means of the wedge lock 20, hereinafter to be described, is a supporting sleeve 21 having arms 22 and 23, within which I have illustrated tool mountings 24 held by the wedge locks 20, and each provided with a separate tool operating on the work, the tool 25 being shown in performance of a turning function and the tool 26 performing a chamfering operation.

In Figures 2 to 5 the carrier comprises a boring bar 30. This bar has originally been provided with a tool slot of the form shown in broken lines in Figure 5, and the adjustment of the tool within the slot has occasion to wear, requiring replacement.

Figure 10:
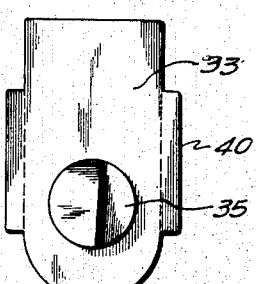
Figures 10 and 11 are like views in end elevation of alternative forms of the device.
Figure 11:
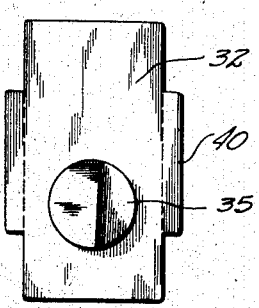

In accordance with the present invention, the tool slot has been enlarged to the form indicated at 31. It will be noted that the sides are preferably parallel, and the ends are rounded on a radius such that the sides are tangential with reference to the arc of the ends. To make such a slot it is only necessary to bore two spaced holes through the bar and to cut away the intervening material tangentially to the walls of the holes. In order that my mounting 24 may readily be used for replacement and repair purposes, it preferably has the form indicated in Figures 6 to 9, inclusive, or the form indicated in Figures 12 to 14, inclusive. The latter form is mounted in a single round hole, and where there is sufficient stock in the carrier this provides an even more convenient mounting. Where the carrier stock is not adequate to permit a round hole of sufficient size to be bored through the carrier, the flattened form shown in Figure 6 is preferred, but the mount may also be made rectangular in cross section as shown at 32 in Figure 11, or it may have rectangularly related sides and one end rounded as shown at 33 in Figure 10.

Figure 6:
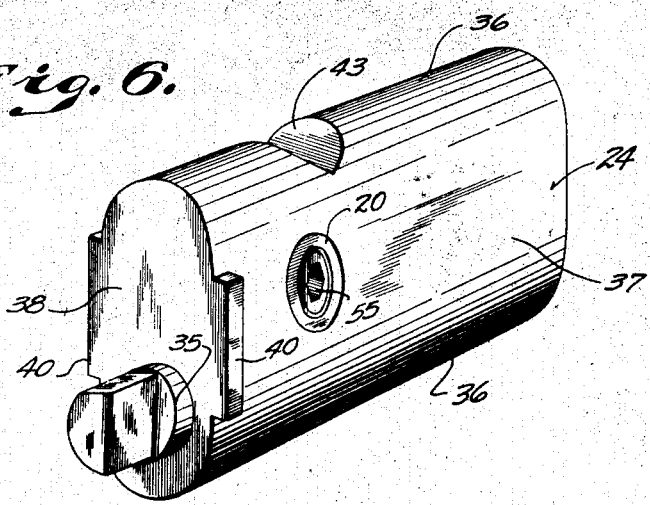
Figure 6 is an enlarged detail view in perspective of the substitute mounting and the tool adjustably assembled therein.
Figure 7:
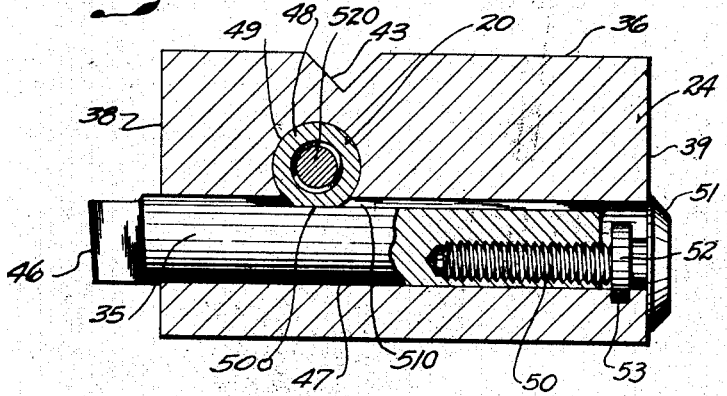
Figure 7 is a detail view of the mounting and tool assembly in longitudinal section.
Figure 8:
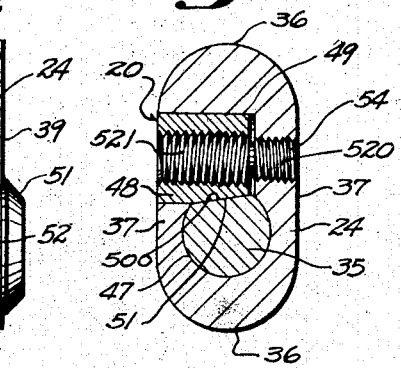
Figure 8 is a detail view of the mounting and tool assembly in transverse section.

In any case, the tool element 35 is preferably offset from the center of the mounting so that whether the wedge lock 20 be transverse as shown in Figures 6 to 8, or longitudinal as shown in Figures 12 to 15, there will always be ample space for it at one side of the tool in the mount.

The mount 24 as shown in Figures 6 to 9 preferably constitutes a solid piece of metal with cylindrical sides 36, flat sides 37, and ends 38 and 39. The end 38 is preferably provided with thrust transmitting flanges 40, whereby the reaction resulting from engagement of tool 35 with the work is transmitted directly to the carrier, independently of any securing devices of any nature. Note that in Figures 2, 3 and 4 I have shown the carrier 30 provided at 41 with a flattened surface abutted by the flanges 40 of the mount 24.

In one of its cylindrical side portions 36 the mount is preferably provided with a flattened bearing surface. The nature of this surface will depend, naturally, on the type of means used to anchor the mount in the carrier. In the construction shown in Figures 3, 6 and 7 the cylindrical wall 36 of the mount is notched at 43 to receive the thrust of a set screw 45, which, as shown in Figure 3, is threaded into the carrier at an angle such as to be normal to the portion of the notch engaged thereby, and to have a component of direction which draws the flanges 40 of the mount tightly into contact with the flat surface 41 of the carrier. This eliminates any play and any wear between the mount and the carrier during the use of the tool.

The tool element 35 comprises a bar having a cutting edge 46. The mount 24 has a bore 47 in which the tool element 35 is reciprocably adjustable. Off center in the tool element is a tapped opening into which the adjusting screw 50 is threaded.

The screw 50 has a spool-shaped head, including a dial flange 51 and the positioning flange 52, the mount being provided with a channel at 53 undercut in the mount concentrically with the axis of the screw 50 to receive flange 52 when the screw is displaced from the axis of bore 47 to a position in which the screw may be engaged in the tool element, as shown in Figure 7. The channel 53 and the thrust bearing surfaces of the flange 52 can all be accurately machined to permit of the graduated adjustment of the tool element without lost motion.

In order to fix the tool element in its adjusted position and also to maintain it against rotation at such times as it is released for adjustment, I provide the wedge lock generically designated by reference character 20. In the form herein disclosed, the wedge lock includes a wedge 48, adjustably reciprocable in the bore 49 of the tool mount. The wedge is generally cylindrical in form except for its tapered wedge surface 500, which is complementary to the flat portion 510 of the tool element 35. The wedge has a central opening tapped to provide threads of given pitch, and a smaller opening having threads of differing pitch is provided in the mount. The screw 520 has a threaded portion 521 (Figure 8), with threads complementary to those of the wedge, and a threaded portion 54 of smaller diameter which has threads complementary to those of the mount. In this particular instance the threads are reversed in direction.

Rotation of the screw in one direction will draw the wedge into binding engagement with the tool element, and rotation of the screw in the opposite direction will force the wedge from binding engagement, while retaining it in operative proximity to the flattened surface 51 of the tool element, whereby to secure the tool element against rotation even at such times as the tool element is free for longitudinal adjustment.

The screw is socketed at 55 (Figure 6) to receive a wrench for its manipulation.

In addition to the hole provided in the mount in which the screw portion 54 operates and through which it is accessible for manipulation, I may provide a registering opening at 57 in the carrier as suggested in Figures 2 and 3, through which a screw driver slot in the larger end portion 521 of the screw is accessible, so that the screw may be actuated to release the tool for adjustment without removing the mount from the carrier.

As above suggested, where the carrier has ample room, I may prefer the type of mount shown in Figures 12 to 15, and designated generically by reference character 240. The exterior outline of this mount is generally cylindrical so that the mount is receivable into a single bored opening. The flange 400 which transmits thrust to the carrier may be annular, and may conveniently be provided with recesses at 58 to receive bolts for fixing the mount in position in the carrier. It may, also, have the notch 43 already described.

The tool element 350 and its mounting in the bore 470, subject to adjustment by manipulation of a screw 50, is all substantially similar in organization to the arrangement previously described. The wedge lock, however, instead of operating transversely with respect to the bore 470, operates longitudinally thereof and comprises the generally cylindrical wedge 480 adjustable in an opening 490 which is pitched at an acute angle toward the bore 470. The differentially threaded screw 530 has its differently pitched and diametered threads engaged respectively with the wedge 480 and with the mount 240, so that when the screw is turned in a wedge tightening direction the respective flattened portions of the wedge and the tool element engage in the plane indicated at 59 to bind the tool in any adjusted position.

This construction makes it unnecessary to provide an additional opening in the carrier through which the manipulation of the wedge lock screw 530 can be effected. As shown in Figures 12 and 15, the end of the wedge lock screw is exposed in the mount directly adjacent the cutting tool.

I claim:

1. A device of the character described, comprising an elongated body provided with cylindrical side portions and having a longitudinal bore, a tool element reciprocably adjustable in said bore and projecting at one end therefrom, said body having thrust transmitting means projecting laterally and adapted to deliver both radial and axial components of reaction thrust of said tool element to a carrier in which said body is mounted, the opposite end of said body being provided with a tool adjusting part, and a screw provided with means fixing its position in said body against displacement longitudinally thereof and having threads in operative connection with said element.

2. In a device of the character described, a tool mount body of elongated form provided with cylindrical side portions and having a longitudinally extending bore and flanges projecting laterally from said body adjacent one end of said bore, of a tool element reciprocably adjustable in said bore and having one end projecting from said flanged tool mount portion, a screw threaded to said element and including a flanged head, said body including means co-acting with said head to secure said screw against axial displacement respecting said body, and means in said body in axially disposed alignment with the tool element for locking said tool element in adjusted position, said locking means having a portion extending through the flange portion to provide adjustment means adjacent the propecting tooth portion.

3. In a device of the character described, the combination with a tool mount body of elongated form having a longitudinally extending bore offset at one side of the center of said body, a tool element reciprocable in said bore and projecting beyond one end of said body, means for adjusting said tool element in said bore, including an operating part accessible at the other end of said body, and means mounted unitarily in said body in the wider side thereof as measured from said bore, including a clamp engageable with said tool element for fixing the adjusted position thereof.

4. In a device of the character described, the combination with a tool body of elongated form adapted to be unitarily mounted in the slot of a tool carrier, said body having a longitudinally extending bore offset at one side of the center thereof, and another bore disposed with its axis at the opposite side of the center of said body and communicating peripherally with said first mentioned bore, a tool element mounted in the first bore and projecting from said body, means in said body for adjusting said tool element, a wedge in the second bore engageable with said tool element, and means for actuating said wedge into clamping relation with said element.

5. In a device of the character described, a tool mount comprising an elongated body having cylindrical side portions and intervening non-cylindrical side portions of flattened form, said body being provided with a longitudinally extending bore at one side of its center and a communicating bore at the other side of its center, a tool element projecting from the longitudinal bore and adjustable therein, a wedge adjustable in the communicating bore to and from binding engagement with said tool element, means for adjusting the wedge, and means for adjusting the tool element comprising a screw in threaded connection therewith and having means interlocked with said body against displacement longitudinally thereof, said screw including an actuating part exposed for manipulation at the end of the body opposite that from which the tool element projects.

6. In a device of the character described, a tool mount comprising an elongated body having cylindrical side portions and intervening non-cylindrical side portions of flattened form, said body being provided with a longitudinally extending bore at one side of its center and a communicating bore at the other side of its center, a tool element projecting from the longitudinal bore and adjustable therein, a wedge adjustable in the communicating bore to and from binding engagement with said tool element, means for adjusting the wedge, and means for adjusting the tool element comprising a screw in threaded connection therewith and having means interlocked with said body against displacement longitudinally thereof, said screw including an actuating part exposed for manipulation at the end of the body opposite that from which the tool element projects, said body having thrust transmitting flange means overhanging its non-cylindrical flattened side portions.

7. A device of the character described, comprising a tool mount body of elongated form having flat sides and spaced cylindrical sides and a longitudinal bore more nearly adjacent one of said cylindrical sides than the other, a tool element reciprocably adjustable in said bore, and a wedge lock mounted in said body beside said bore and engageable with said tool element for clamping it in a predetermined position of adjustment.

8. A device of the character described, comprising a tool mount body of elongated form having flat sides and spaced cylindrical sides and a longitudinal bore more nearly adjacent one of said cylindrical sides than the other, a tool element reciprocably adjustable in said bore, and a wedge lock mounted in said body beside said bore and engageable with said tool element for clamping it in a predetermined position of adjustment, said body having a transverse bore intersecting said first mentioned bore and said wedge lock comprising a wedge reciprocable in the transverse bore to and from engagement with said element, and a screw for controlling the position of said wedge.

9. In a device of the character described, a tool mount body of elongated form having a longitudinal opening and a shorter longitudinally extending second opening inclined to intersect said first opening, of a tool element longitudinally adjustable in the first opening, a wedge element longitudinally reciprocable in the second opening to and from binding engagement with said first element, and screw means for forcing said wedge into binding engagement with said tool element.

10. A device of the character described, comprising a tool mount body of elongated form having cylindrical side portions and provided with intersecting longitudinally disposed bores both opening at one end of said body, a tool element reciprocable in one of said bores, a wedge reciprocable in the other of said bores, said element and wedge having surfaces in bearing contact, and screw means disposed between said wedge and body for adjusting said wedge respecting said tool element.

11. A device of the character described, comprising a tool mount body of elongated form having cylindrical side wall portions, a longitudinal bore extending through said body from one end to the other at one side of its center line, and a second longitudinal bore extending into said body from one of its ends in a direction inclined with reference to the first bore and communicating therewith, a tool element reciprocably adjustable in the first bore and projecting at one end of said body, said tool element being provided with adjusting mechanism exposed at the other end of said first bore for manipulation, a wedge in the inclined bore having a bearing surface engaging said tool element, and screw means in the inclined bore for actuating said wedge with respect to said body and said tool element, whereby to clamp said tool element in a position of adjustment respecting said body.

12. In a rotatable tool carrier having a tool mount removably socketed therein, the combination of a projection on the mount engageable with the carrier to limit movement of the mount in one direction and a screw having threaded engagement with the carrier and movable against the mount in a direction to force the projection in pressure engagement against the carrier.

EDWARD HASSIG.